Jan. 26, 1926.  1,570,853
W. L. MONRO ET AL
MANUFACTURE OF GLASS CYLINDERS
Filed April 29, 1918  2 Sheets-Sheet 1
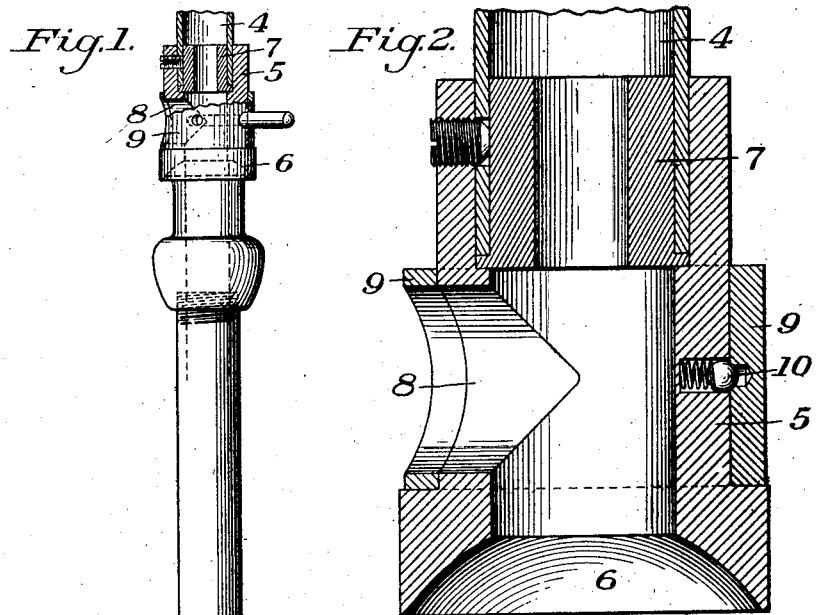
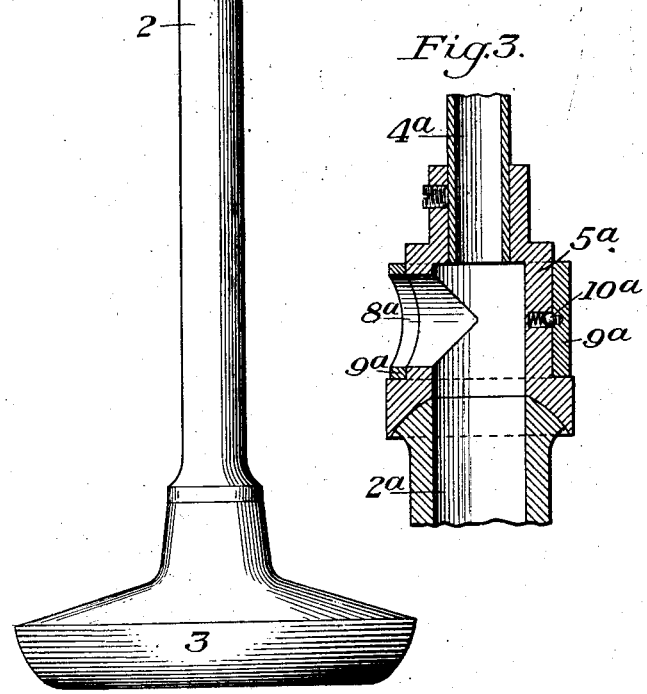
WITNESSES
INVENTORS

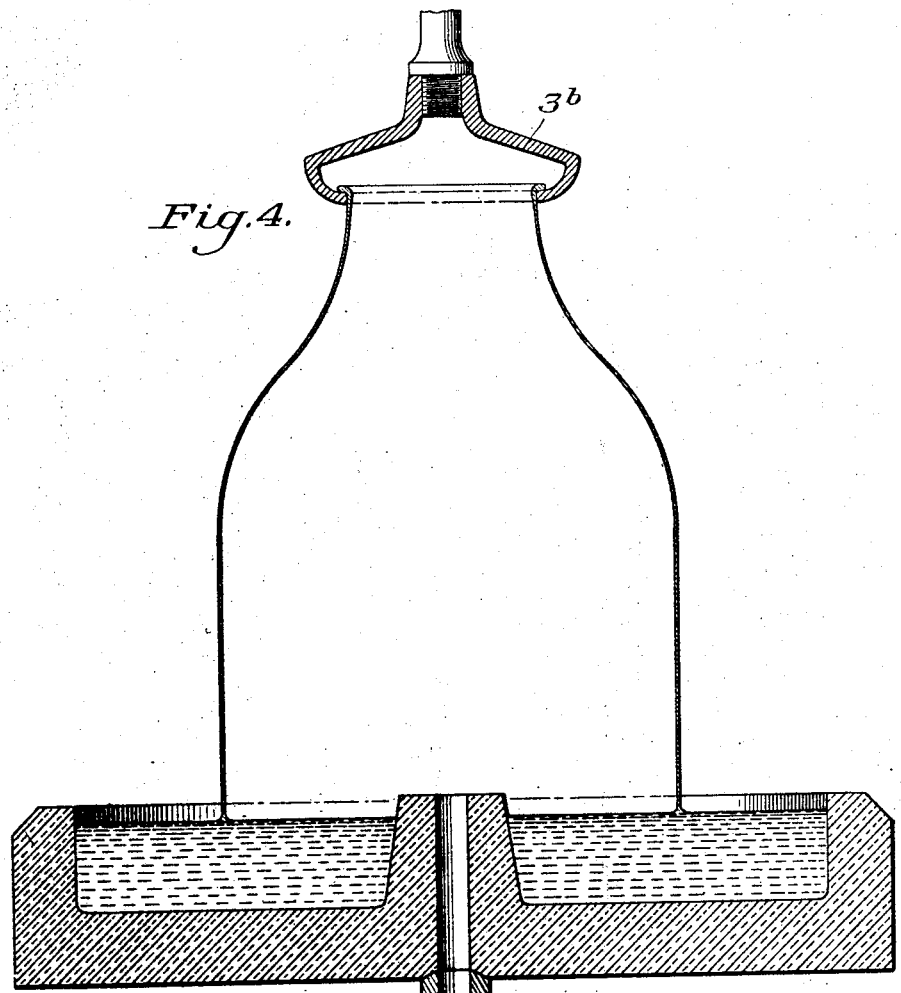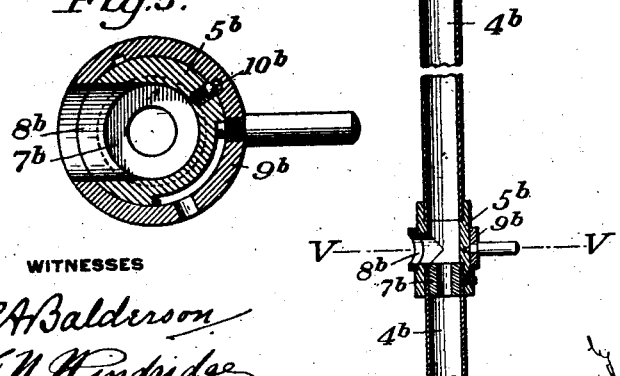

Patented Jan. 26, 1926.

1,570,853

UNITED STATES PATENT OFFICE.

WILLIAM L. MONRO, OF PITTSBURGH, HENRY F. CLARK, OF OAKMONT, AND LONNIE J. PIERCE, OF PITTSBURGH, PENNSYLVANIA, ASSIGNORS TO WINDOW GLASS MACHINE COMPANY, OF PITTSBURGH, PENNSYLVANIA, A CORPORATION OF NEW JERSEY.

MANUFACTURE OF GLASS CYLINDERS.

Application filed April 29, 1918. Serial No. 231,332.

*To all whom it may concern:*

Be it known that we, WILLIAM L. MONRO, residing at Pittsburgh, HENRY F. CLARK, residing at Oakmont, and LONNIE J. PIERCE, residing at Pittsburgh, all in the county of Allegheny and State of Pennsylvania, have invented a new and useful Improvement in the Manufacture of Glass Cylinders, of which the following is a full, clear, and exact description, reference being had to the accompanying drawings, forming part of this specification, in which—

Figure 1 is a side elevation partly broken away of apparatus constructed in accordance with our invention;

Figure 2 is an enlarged vertical section of the vent system proper;

Figures 3 and 4 are sectional views showing modified forms; and

Figure 5 is a section on the line V—V of Figure 4.

Our invention relates to the Lubbers venting system used in the drawing of glass cylinders, and is designed to improve such system and still further reduce or eliminate the pulsations of the air within the cylinder. Use of our system shows that, while the Lubbers venting system is effectual in reducing pulsation bumps of the cylinder to a point within commercial limits, in flattening; our improvement will still further reduce these bumps, and if properly installed, will substantially eliminate them.

In carrying out our invention, the air is supplied to the top of the cylinder through the bait, and the entering air is discharged from a jet opening into an air chamber or channel of larger area than the inlet jet. This air chamber has a vent which is open during the forming of the cylinder proper, and in the preferred form, the vent is of larger area than the inlet jet, and its cross sectional area is always smaller than the cross sectional area of the cylinder being drawn.

Referring to the form of Figures 1 and 2, 2 represents the usual blow-pipe having at its lower end the bait 3. This blow-pipe is connected with the air-supply pipe 4, through a coupling member 5, which, in the form shown, has a ball-and-socket joint at 6 with the upper end of the removable blow-pipe.

In this form, the lower portion of the pipe 4 is provided with an internal reducing bushing 7, from which the jet of air emerges into the chamber or space from which the vent opening or openings lead. The vent is shown at 8, and may be of the usual form, having a surrounding shutter 9, which may be turned to open or close the vent or make the vent of different effective areas. 10 is a spring-pressed lock for the shutter.

The novel feature of this structure from that heretofore commonly used lies in the fact that the jet opening into the air chamber is of smaller bore than the chamber from which the vent opening leads, the latter being larger than this inlet jet opening.

Continued experiments with this apparatus have proven that this new relation of the size of the inlet air opening to the vent opening in such apparatus will greatly improve the cylinder as regards the presence of pulsation bumps.

We have found it highly advantageous to provide a wall opposite the venting opening as shown in Figures 2 and 3, since this forms a chamber at least partially enclosed lateral to the air stream, which taken with a jet opening of smaller cross-sectional area than the venting chamber, provides a pocket opposite the vent. In this pocket the pressure appears to be reduced. The best theory for the action of this apparatus is that the air stream is drawn slightly out of line toward the pocket, and any variation in the cylinder pressure is reflected in the swaying of the air stream back and forth in the venting chamber. This swaying causes greater or less air flow through the vent opening, and serves to more accurately regulate the cylinder pressure. It is, of course, difficult if not impossible to determine exactly why this peculiar combination effects the desired results, but it is found to regulate the cylinder pressure more accurately than heretofore.

We have found that the best results are obtained when the ratio of cross-sectional areas of air jet opening to air chamber is substantially one to four, and when the same ratio exists between the cross-sectional areas of air jet opening and vent opening. These conditions would be met, for example, by an air jet opening of three-fourths inches diameter, with the venting opening and chamber each one and one-half inches diameter.

We have found that the location of the venting opening is important. As shown in Figures 2 and 3, the venting opening terminates adjacent to the plane of the air inlet opening. We believe this to be important since the action of the vent is rendered more sensitive when the edge of the venting opening is adjacent to the air inlet opening.

In Figure 3, we show a form similar to that of Figures 1 and 2, except that instead of using a reducing bushing for the pipe leading to the air chamber, we show an air-supply pipe 4ª of smaller internal diameter than the internal diameter of the air chamber, thus giving the same jet action therein relative to the vent opening. In this figure, parts similar to those of Figures 1 and 2 are marked with similar numerals with the letter "a" applied.

In Figures 4 and 5, we have shown our invention in a form in which the air is supplied upwardly through the drawing vessel and independently of the bait. In these figures, corresponding parts have been given the same reference numerals as in Figures 1 and 2, with the letter "b" applied thereto.

The advantages of our invention result from the material reduction in pulsation bumps of the cylinders produced, whereby cylinders of any practical length may be obtained which, for all important purposes, are free from bumps. The invention is of particular value in drawing thin glass cylinders of large sizes.

The type of air supply may be varied, the sizes of the various openings may be varied within the requirements above stated, and the relative position of the parts may be varied somewhat within the scope of the appended claims.

I claim:

1. In apparatus for drawing glass cylinders, a bait having a relatively long enclosed conduit leading into it, the conduit passage being of less cross sectional area than the glass attaching portion of the bait, and an air supply pipe having a discharge opening of smaller cross sectional area than the passage in the bait conduit and discharging into the upper part of said conduit, said apparatus having a venting opening between the air discharge opening of the air supply pipe and the conduit passage leading to the bait, and also having a pocket opposite the venting opening, substantially as described.

2. In apparatus for drawing glass cylinders, a bait having a relatively long enclosed conduit leading into it, the conduit passage being of less cross sectional area than the glass attaching portion of the bait, and an air supply pipe having a discharge opening of smaller cross sectional area than the passage in the bait conduit and discharging into the upper part of said conduit, said apparatus having a venting opening of definite area between the air discharge opening of the air supply pipe and the conduit passage leading to the bait, and also having a pocket opposite the venting opening, substantially as described.

3. In the machine drawing of glass cylinders from a glass bath, the method of supplying air to the interior of the cylinder being drawn which consists in forcing a jet of air between a venting space having a definite opening to the atmosphere of less area than the cross sectional area of the cylinder being drawn and a pocket opposite thereto and into a relatively long enclosed passage leading to the cylinder, which enclosed passage is larger in cross section than the jet opening but smaller than the cross section of the article being drawn, substantially as described.

4. In apparatus for drawing glass cylinders, a bait, a chamber above the bait through which air is supplied to the cylinder being drawn, having an air inlet opening which is of smaller cross-sectional area than and is adapted to discharge air in jet form into the chamber, said chamber being at least partially enclosed laterally of the air stream and having a venting opening, substantially as described.

5. In apparatus for drawing glass cylinders, a chamber through which air is supplied to the cylinder being drawn, having an air inlet opening which is of smaller cross-sectional area than and is adapted to discharge air in jet form into the chamber, said chamber also having a venting opening and a pocket opposite thereto, substantially as described.

6. In apparatus for drawing glass cylinders, a bait, an air conduit leading thereto and a chamber in the air conduit, the chamber having an opening which is of smaller cross-sectional area than and is adapted to discharge air in jet form into the chamber, said chamber being at least partially enclosed laterally of the air stream and having a venting opening, substantially as described.

7. In apparatus for drawing glass cylinders, a bait, an air conduit leading thereto and a chamber in the air conduit, the chamber having an opening which is of smaller cross-sectional area than the chamber and is adapted to discharge air in jet form into the chamber, said chamber having a venting opening laterally of the air jet, and a pocket opposite thereto, substantially as described.

8. In apparatus for drawing glass cylinders, a chamber through which air is supplied to the cylinder being drawn, having an air inlet opening which is adapted to discharge air in jet form into the chamber and which has a cross-sectional area of substantially one-fourth the cross-sectional area of the chamber, said chamber being at least partially enclosed laterally of the air stream and having a venting opening, substantially as described.

9. In apparatus for drawing glass cylinders, a chamber through which air is supplied to the cylinder being drawn, having an air inlet opening which is adapted to discharge air in jet form into the chamber and which has a cross-sectional area of substantially one-fourth the cross-sectional area of the chamber, said chamber being at least partially enclosed laterally of the air stream and having a venting opening whose cross-sectional area is substantially the cross-sectional area of the chamber, substantially as described.

10. In the machine drawing of glass cylinders, the method of supplying air to the cylinder which includes directing a jet of air into an enlarged partially enclosed chamber between a vent and a pocket therein and thence to the cylinder being drawn, substantially as described.

11. In apparatus for drawing glass cylinders, a chamber through which air is supplied to the cylinder being drawn having an air inlet opening which is of smaller cross sectional area than and is adapted to discharge air in jet form into the chamber, said chamber having a venting opening on one side only of the air jet and a pocket on the other side thereof, substantially as described.

12. In apparatus for drawing glass cylinders, a chamber through which air is supplied to the cylinder being drawn having an air inlet opening which is of smaller cross-sectional area than and is adapted to discharge air in jet form into the chamber, said chamber being enclosed at least half way around the jet, substantially as described.

In testimony whereof, we have hereunto set our hands.

WILLIAM L. MONRO.
HENRY F. CLARK.
LONNIE J. PIERCE.